(12) United States Patent
Bentley

(10) Patent No.: US 6,978,014 B1
(45) Date of Patent: Dec. 20, 2005

(54) APPARATUS FOR PROVIDING POWER TO LINE DRIVERS IN A COMMUNICATION SYSTEM

(75) Inventor: Ronald Bentley, Santa Rosa, CA (US)

(73) Assignee: Alcatel, Paris (FR)

( * ) Notice: Subject to any disclaimer, the term of this patent is extended or adjusted under 35 U.S.C. 154(b) by 666 days.

(21) Appl. No.: 10/042,556

(22) Filed: Nov. 19, 2001

(51) Int. Cl.[7] .............................................. H04M 19/00
(52) U.S. Cl. ...................................... 379/413; 330/127
(58) Field of Search .......................... 379/413; 330/96, 330/127, 135, 136, 297

(56) References Cited

U.S. PATENT DOCUMENTS

| | | | |
|---|---|---|---|
| 5,898,342 A * | 4/1999 | Bell | 330/297 |
| 6,204,650 B1 * | 3/2001 | Shimamori | 323/283 |
| 6,329,800 B1 * | 12/2001 | May | 323/283 |
| 6,333,654 B1 * | 12/2001 | Harris et al. | 327/170 |

* cited by examiner

Primary Examiner—Sinh Tran
Assistant Examiner—Daniel Swerdlow
(74) Attorney, Agent, or Firm—Donald D. Mondul; Bobby D. Slaton; V. Lawrence Sewell

(57) ABSTRACT

The apparatus for provides power to selected line drivers in a communication system. Each selected line driver has a respective inherent internal voltage drop. Each selected line driver is coupled with a respective communication loop for providing a respective minimum operational voltage to the respective communication loop. The apparatus includes: (a) a control means coupled with the selected line driver devices for controlling supply voltage to the selected line drivers; and (b) a power supply means coupled with the control means and with the selected line driver devices and cooperating with the control means to deliver a respective supply voltage to respective selected line driver devices. The respective supply voltage is at least equal with the respective minimum operational voltage less the respective inherent internal voltage drop for each respective selected line driver device.

23 Claims, 4 Drawing Sheets

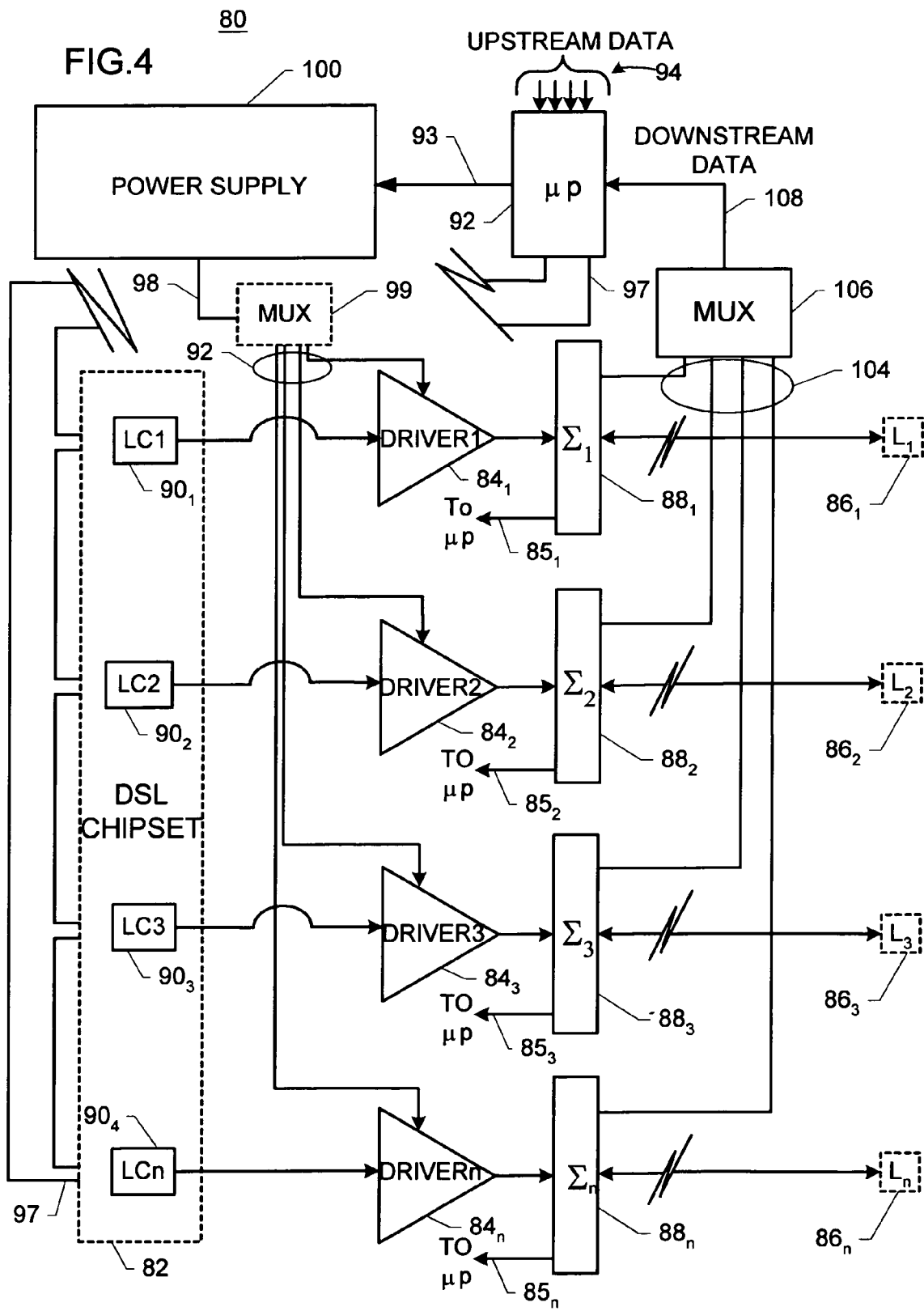

APPARATUS FOR PROVIDING POWER TO LINE DRIVERS IN A COMMUNICATION SYSTEM

BACKGROUND OF THE INVENTION

The present invention is directed to power supplies for providing operating voltages for line driver devices in communication systems. In particular, the preferred embodiment of the invention is a power supply system for selectively providing operating voltages to line drivers in a telecommunication system.

Line cards are components of digital subscriber line (DSL) chipsets that control operation of line driver devices. A DSL line card preferably uses a chipset which generates a signal to a line driver. The line driver drives a line in a telecommunication system. The chipset and the line driver are preferably physically part of the linecard. Linecards are usually situated in channel banks in a communication system, such as a telecommunication system. Each channel bank typically includes about 70–80 line cards, depending upon the particular implementation. Line cards cooperate with line driver devices to drive the transmission line and load associated with a particular communication loop. Customer provided equipment is coupled at the distal end of a communication loop that is serviced (i.e., driven) by a particular line card among the many line cards in a channel bank. Communication loops may vary significantly in their relevant characteristics. For example, longer lines (i.e., longer loops) and lines that operate at higher data rates require relatively higher power levels at their source. Such long/higher rate lines are known as lossier lines. Shorter lines or lines operating at a relatively lower data rate require a lower power at their source (i.e., lower power at the line card). It is likely that the various loads in a particular communication system will be significantly different among the various communication loops.

Line drivers in communication applications typically use a 15 volt single-ended or split power supply. In practice, the peak-to-peak output voltage from a line driver is limited to a maximum value, typically on the order of 1–2 volts, below the rail-to-rail power supply difference. Power delivered to the line card that is not delivered to the line is dissipated within the line driver as heat.

Heat is generally not desirable in electronic products. In fact, it is the presence of such generated heat that sometimes causes system designers to avoid fully occupying a particular channel bank. If the channel bank is fully populated to its maximum number of line drivers, the heat generated by the fully populated power consumption and the resulting power dissipation could harm the operation of the system and could cause system difficulties.

There are two paramount design considerations observed by designers of line cards and line drivers. One such design consideration is to deliver only the amount of power to a line that is necessary to achieve the desired communications. The other such design consideration is to operate the line driver device under conditions that enable the line driver device to deliver the designed signal to the line while consuming a minimal amount of power.

That is, given the line loss of a receiver (i.e., the sensitivity of the receiver) on the line to be driven, and given the data rate desired for operation of the line, the power to be delivered to the line may be determined. The operating conditions of the line driver may be adjusted for delivering the requisite amount of power to the line with the least distorion attainable. By way of example, and not by way of limitation, specific parameters that are amenable to adjustment in a bipoar transistor amplifier are quiescent current and supply voltage, or voltages. Quiescent current is current passing through an amplifier when no power is being delivered to the load of the amplifier.

The problem of excess power supplied to line drivers and the resultant heat generation by power dissipation is exacerbated by the unpredictability of the load driven by respective line drivers.

There is a need for selective power supply among line drivers in order that appropriate power may be provided to variously loaded line drivers.

There is a need for intelligent provision of selective power supply to line drivers in order to enable communication systems to adapt to various conditions encountered in various communication loops.

SUMMARY OF THE INVENTION

The need for selective intelligent provision of supply power to line drivers in a communication system is fulfilled by the apparatus of the present invention. The apparatus of the present invention adjusts to the respective load for a particular line driver by setting the power supplied to the particular line driver at a level to enable the line driver to deliver a predetermined signal power to the line with satisfactory linearity (i.e., with minimal distortion).

The apparatus provides power to selected line drivers in a communication system. Each selected line driver has a respective inherent internal voltage drop. Each selected line driver is coupled with a respective communication loop for providing a respective minimum operational voltage to the respective communication loop. The apparatus includes: (a) a control means coupled with the selected line driver devices for controlling supply voltage to the selected line drivers; and (b) a power supply means coupled with the control means and with the selected line driver devices and cooperating with the control means to deliver a respective supply voltage to respective selected line driver devices. The respective supply voltage is at least equal with the respective minimum operational voltage less the respective inherent internal voltage drop for each respective selected line driver device.

It is, therefore, an advantage of the present invention to provide an apparatus for furnishing selective power supply among line drivers in order that appropriate power be provided to variously loaded line drivers.

It is a further an advantage of the present invention to provide an apparatus for intelligent furnishing of selective power supply to line drivers in order to enable communication systems to adapt to various conditions encountered in various communication loops.

Further objects and features of the present invention will be apparent from the following specification and claims when considered in connection with the accompanying drawings, in which like elements are labeled using like reference numerals in the various figures, illustrating the preferred embodiments of the invention.

BRIEF DESCRIPTION OF THE DRAWINGS

FIG. 4 is a schematic diagram illustrating an alternate embodiment of the present invention.

DETAILED DESCRIPTION OF THE PREFERRED EMBODIMENT

Figure 1:
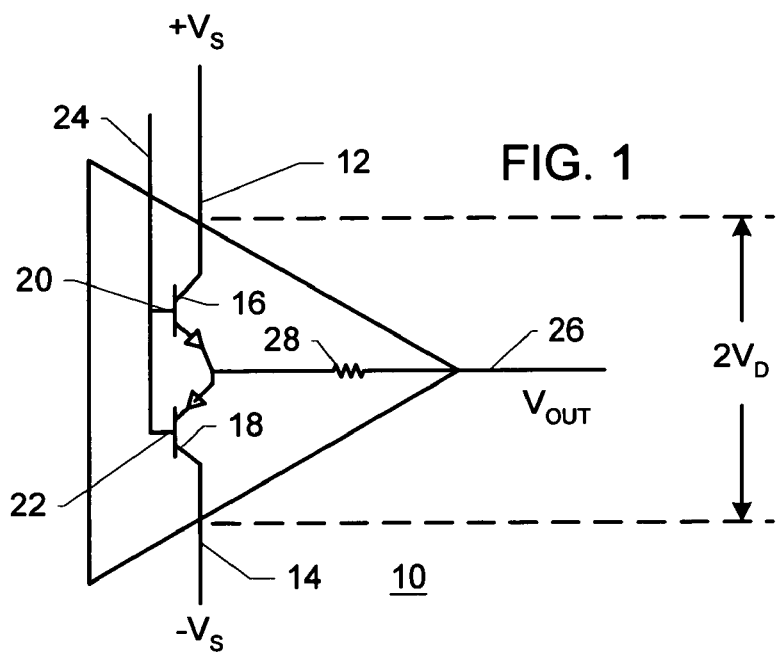
FIG. 1 is a simplified electrical schematic drawing illustrating a representative line driver device used in a communication system.

FIG. 1 is a simplified electrical schematic drawing illustrating a representative line driver device used in a communication system. In FIG. 1, a line driver 10 is provided with an operating supply voltage $\pm V_s$ at supply terminals 12, 14. Transistors 16, 18 are coupled in series intermediate supply terminals 12, 14. Transistors 16, 18 are gated at respective gates 20, 22 by application of a gating signal via a gating line 24. When transistors 16, 18 are gated, supply voltage $V_S$ is coupled with an output terminal 26 via an internal load impedance 28 to present an output voltage $V_{OUT}$ at output terminal 26. Output terminal 26 is coupled with a communication loop (not shown in FIG. 1) having a load that includes customer provided equipment (not shown in FIG. 1).

It is the voltage drop across transistors 16, 18 and output voltage $V_{OUT}$ at output terminal 26 that is compared with supply voltage $V_S$ to ascertain power dissipation by line driver 10. That is, output voltage $V_{OUT}$ at output terminal 26, plus voltage drop 2VD across transistors 16, 18 indicate the maximum voltage required $V_{REQ}$ by line driver 10:

$$V_{REQ} = V_{OUT} + 2VD \qquad [1]$$

Accordingly, any excess of supply voltage $V_S$ over required voltage $V_{REQ}$ is dissipated, mainly in the form of undesirable heat.

$$V_S - V_{REQ} = \text{Excess} \qquad [2]$$

Figure 2:
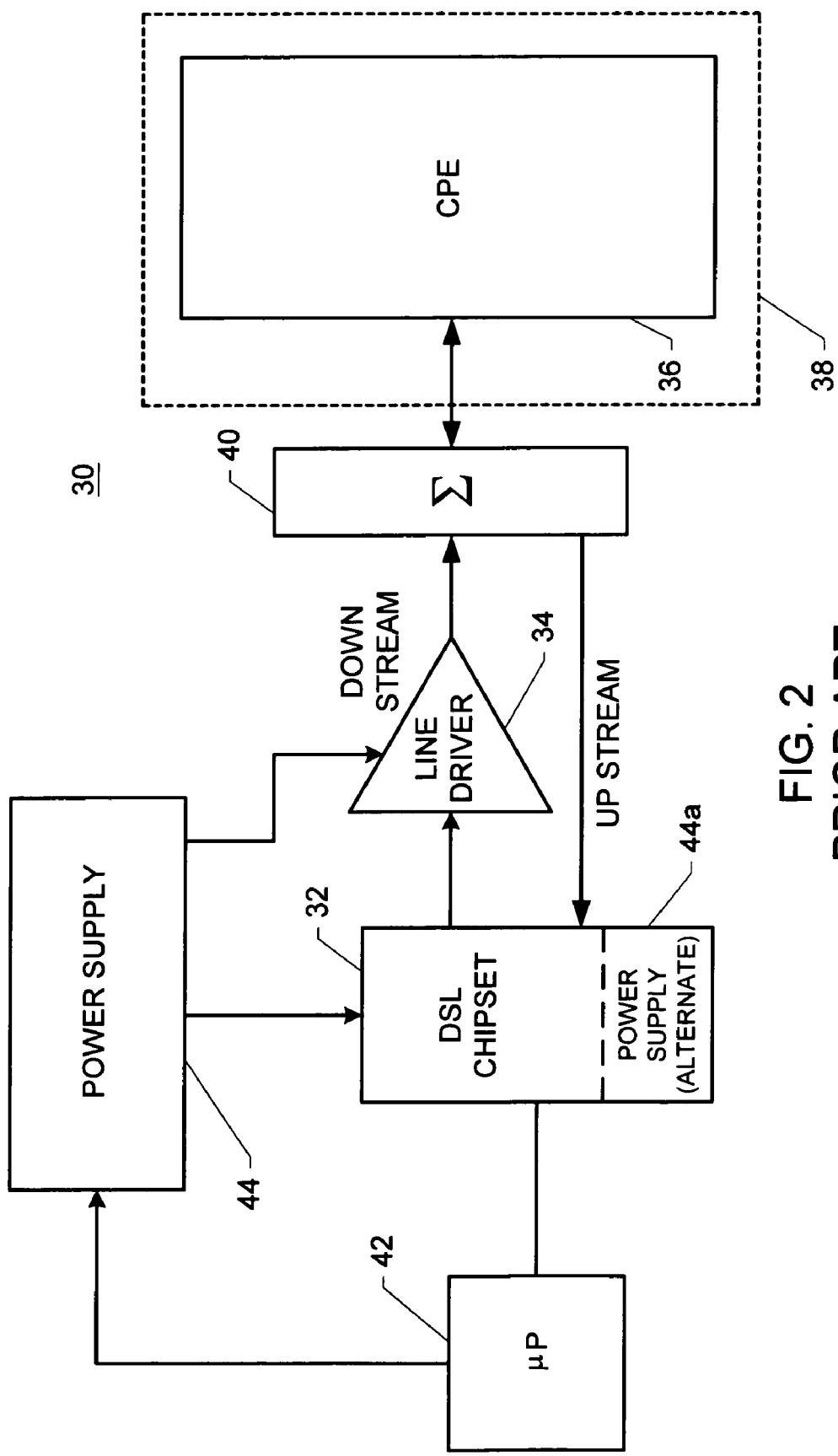
FIG. 2 is a simplified schematic block diagram illustrating aspects of a typical communication system that are pertinent to the present invention.

FIG. 2 is a simplified schematic block diagram illustrating aspects of a typical communication system that are pertinent to the present invention. In FIG. 2, a communication system 30 includes a digital subscriber line (DSL) chip 32 coupled with a line driver 34. Line driver 34 is coupled with a communication loop 38. Communication loop 38 includes customer provided equipment (CPE) 36. Intermediate line driver 34 and communication loop 38 is a directional summer device 40. Directional summer device 40 directs signals from line driver 34 in a downstream direction (i.e., toward communication loop 38) to CPE 36, and directs signals in an upstream direction (i.e., from communication loop 38) from CPE 36 directly to DSL chipset 32.

Communication system 30 further includes a microprocessor 42 and a power supply 44. Microprocessor 42 is coupled with DSL chipset 32 and with power supply 44. Microprocessor 42 controls operation of communication system 30 according to predetermined operational parameters embodied in hardware and software. Power supply 44 is coupled with DSL chipset 32 and with line driver 34. A typical communication system of the sort represented by communication system 30 includes a plurality of line drivers 34, and power supply 44 is coupled with each of the line drivers in the system. Accordingly, power supply 44 provides the same supply voltage to each of the line drivers in the communication system, such as line driver 34 in communication system 30. It is in this prior art approach of providing one supply voltage to all line drivers 34 in a communication system 30 that problems arise with excess power being dissipated.

Power supply 44 is also coupled with DSL chipset 32 to provide operating voltage to DSL chipset 32. In communication systems having more than one DSL chipset 32, power supply 44 may supply power to all DSL chipsets in the communication system. Alternatively, each DSL chipset 32 may have its own respective internal power supply, as indicated by power supply 44a in FIG. 2.

Figure 3:
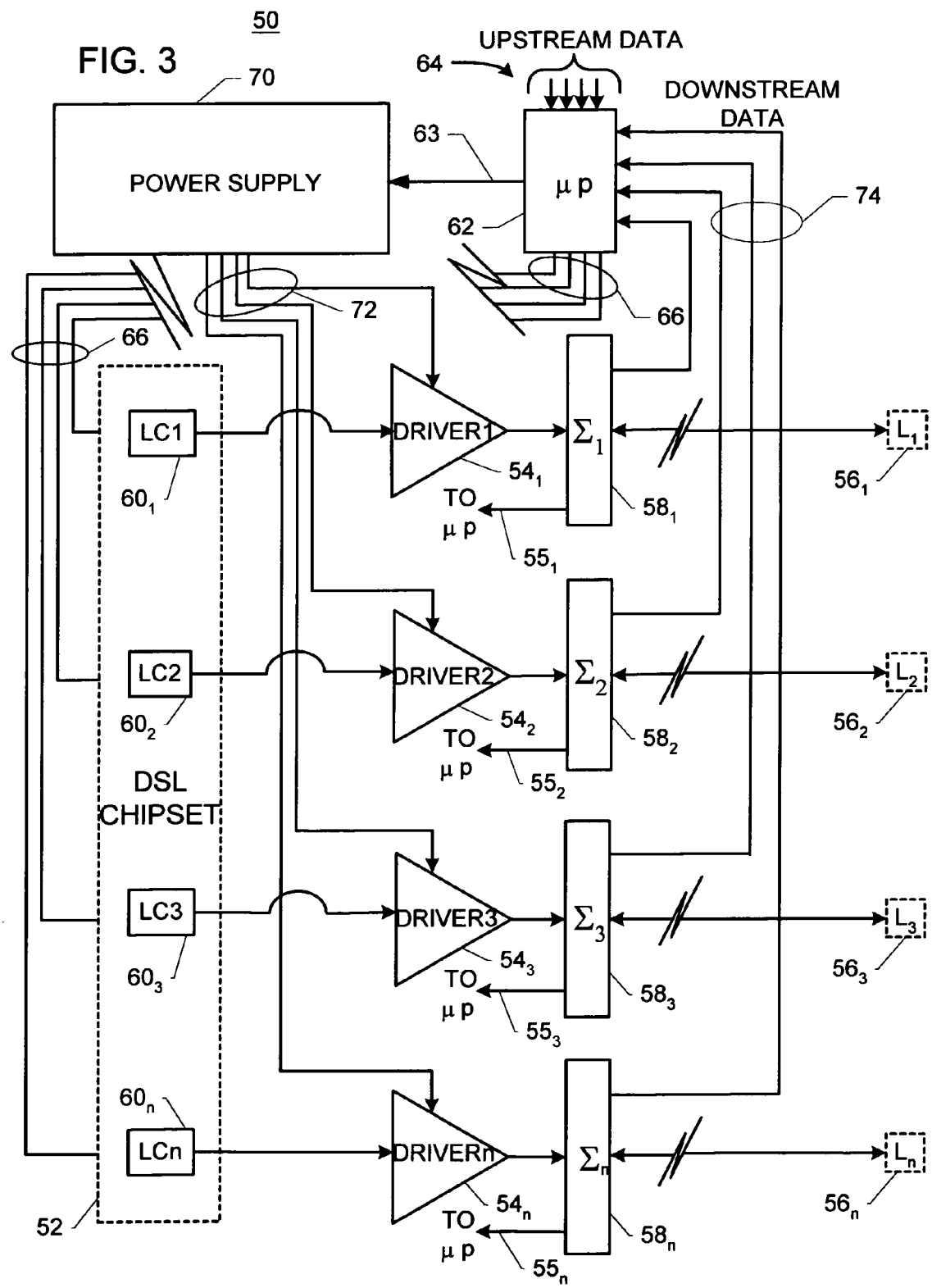
FIG. 3 is a schematic diagram illustrating the preferred embodiment of the present invention.

FIG. 3 is a schematic diagram illustrating the preferred embodiment of the present invention. In FIG. 3, a communication system 50 includes a DSL chipset 52 operating a plurality of line drivers $54_1, 54_2, 54_3, 54_n$. Each line driver $54_1, 54_2, 54_3, 54_n$ is coupled for service with a respective communication loop $56_1, 56_2, 56_3, 56_n$. Each respective communication loop $56_1, 56_2, 56_3, 56_n$ includes customer provided equipment (CPE; not shown in FIG. 3).

Intermediate each communication loop $56_1, 56_2, 56_3, 56_n$ and its respective coupled line driver $54_1, 54_2, 54_3, 54_n$ is a respective directional summer device $58_1, 58_2, 58_3, 58_n$. Each respective directional summer device $58_1, 58_2, 58_3, 58_n$ directs signals from its respective coupled line driver $54_1, 54_2, 54_3, 54_n$ in a downstream direction to its respective communication loop $56_1, 56_2, 56_3, 56_n$, and directs signals in an upstream direction from its respective communication loop $56_1, 56_2, 56_3, 56_n$. Signals traveling in an upstream direction from a respective communication loop $56_1, 56_2, 56_3, 56_n$ are routed by a respective directional summer device $58_1, 58_2, 58_3, 58_n$ to a microprocessor 62, as indicated by upstream directional terminals $55_1, 55_2, 55_3, 55_n$.

DSL chipset 52 includes a line card $60_1, 60_2, 60_3, 60_n$ for each respective line driver $54_1, 54_2, 54_3, 54_n$. A microprocessor 62 controls operation of communication system 50 according to predetermined operational parameters embodied in hardware and software. Accordingly, microprocessor 62 receives information bound upstream from upstream directional terminals $55_1, 55_2, 55_3, 55_n$ at upstream information input terminals 64. Upstream data, or information is appropriately provided to line cards $60_1, 60_2, 60_3, 60_n$ for operating communication system 50 according to the predetermined operational parameters. In the preferred embodiment of the present invention illustrated in FIG. 3, upstream information is provided by microprocessor 62 to respective line cards $60_1, 60_2, 60_3, 60_n$ via individual routing lines 66. In such an arrangement, each respective line card has a dedicated routing line 66 for communication with microprocessor 62. Other connection arrangements may be established between microprocessor 62 and line cards $60_1, 60_2, 60_3, 60_n$, as will be recognized by those skilled in the art of communication system design.

A power supply 70 is coupled with line drivers $54_1, 54_2, 54_3, 54_n$ for providing a supply voltage to respective line drivers $54_1, 54_2, 54_3, 54_n$ (e.g., supply voltage $V_S$; FIG. 1). Connection among power supply 70 and line drivers $54_1, 54_2, 54_3, 54_n$ is illustrated in the preferred embodiment of the invention in FIG. 3 as being effected via dedicated connection lines 72. Other connection arrangements may be established between power supply 70 and line drivers $54_1, 54_2, 54_3, 54_n$, as will be recognized by those skilled in the art of communication system design.

Another connection is made with microprocessor 62 to deliver an indication to microprocessor 62 of the output voltage requirement for each respective communication loop $56_1, 56_2, 56_3, 56_n$. The coupling of microprocessor 62 with respective directional summer devices $58_1, 58_2, 58_3, 58_n$ is illustrated in FIG. 3 as the preferred construction for effecting the connection. Other connections could likewise provide the desired information, such as connection with respective communication loops $56_1, 56_2, 56_3, 56_n$, or other loci downstream from line drivers $54_1$, $54_2$, $54_3$, $54_n$. Connection among microprocessor 62 and directional summer devices $58_1$, $58_2$, $58_3$, $58_n$ is illustrated in the preferred embodiment of the invention in FIG. 3 as being effected via dedicated connection lines 74. Other connection arrangements may be established between microprocessor 62 and directional summer devices $58_1$, $58_2$, $58_3$, $58_n$, as will be recognized by those skilled in the art of communication system design.

Microprocessor 62 is coupled with power supply 70, as indicated by a connecting line 63. This is an important coupling because it facilitates the desired cooperation between microprocessor 62 and power supply 70 to tailor supply voltages supplied to respective line drivers $54_1$, $54_2$, $54_3$, $54_n$ taking into account the operating conditions then extant with each respective line driver $54_1$, $54_2$, $54_3$, $54_n$. This is possible because microprocessor 62 receives information relating to the extant operating conditions of line drivers $54_1$, $54_2$, $54_3$, $54_n$ via connection lines 74 and shares that information with power supply 70. Thus, power supply 70 can ensure that no excess power is delivered to line drivers $54_1$, $54_2$, $54_3$, $54_n$. No excess power means that no unnecessary heat is generated. In practice a certain minimal amount of extra power may be delivered to line drivers $54_1$, $54_2$, $54_3$, $54_n$ in order to ensure safe operating margins are established to avoid interruption of service.

Determination of operating conditions for respective line drivers $54_1$, $54_2$, $54_3$, $54_n$ may be carried out during training cycles conducted by line drivers. Such training cycles are typically conducted at start up, and may be periodically repeated at intervals or upon occurrence of predetermined events during operation of a communication system. Alternatively, determination of operating conditions for line drivers $54_1$, $54_2$, $54_3$, $54_n$ may be carried out on a continuing basis during operation of a communication system. Such a continuing determining of operating conditions provides a capability for adjusting power output from a power supply to respective line drivers "on the fly". For example, if operating conditions of a particular line driver $54_1$, $54_2$, $54_3$, $54_n$ is determined to involve a no-load condition, power output from an appropriate power supply may be adjusted to a predetermined minimum level reflecting the desired quiescent current for the particular line driver $54_1$, $54_2$, $54_3$, $54_n$ that is in a no-load condition.

FIG. 4 is a schematic diagram illustrating an alternate embodiment of the present invention. In FIG. 4, a communication system 80 includes a DSL chipset 82 operating a plurality of line drivers $84_1$, $84_2$, $84_3$, $84_n$. Each line driver $84_1$, $84_2$, $84_3$, $84_n$ coupled for service with a respective communication loop $86_1$, $86_2$, $86_3$, $86_n$. Each respective communication loop $86_1$, $86_2$, $86_3$, $86_n$ includes customer provided equipment (CPE; not shown in FIG. 4).

Intermediate each communication loop $86_1$, $86_2$, $86_3$, $86_n$ and its respective coupled line driver $84_1$, $84_2$, $84_3$, $84_n$ is a respective directional summer device $58_1$, $58_2$, $58_3$, $58_n$. Each respective directional summer device $88_1$, $88_2$, $88_3$, $88_n$ directs signals from its respective coupled line driver $84_1$, $84_2$, $84_3$, $84_n$ in a downstream direction to its respective communication loop $86_1$, $86_2$, $86_3$, $86_n$, and directs signals in an upstream direction from its respective communication loop $86_1$, $86_2$, $86_3$, $86_n$. Signals traveling in an upstream direction from a respective communication loop $86_1$, $86_2$, $86_3$, $86_n$ are routed by a respective directional summer device $88_1$, $88_2$, $88_3$, $88_n$ to a microprocessor 92, as indicated by upstream directional terminals $85_1$, $85_2$, $85_3$, $85_n$.

DSL chipset 82 includes a line card $90_1$, $90_2$, $90_3$, $90_n$ for each respective line driver $84_1$, $84_2$, $84_3$, $84_n$. A microprocessor 92 controls operation of communication system 80 according to predetermined operational parameters embodied in hardware and software. Accordingly, microprocessor 92 receives information bound upstream from upstream directional terminals $85_1$, $85_2$, $85_3$, $85_n$ at upstream information input terminals 94. Upstream data, or information is appropriately provided to line cards $90_1$, $90_2$, $90_3$, $90_n$ for operating communication system 80 according to the predetermined operational parameters. In the alternate embodiment of the present invention illustrated in FIG. 4, upstream information is provided by microprocessor 92 to respective line cards $90_1$, $90_2$, $90_3$, $90_n$ via a communication bus 97. In such an arrangement, each individual line card $90_1$, $90_2$, $90_3$, $90_n$ is assigned a respective address so that delivery to a particular respective line card $90_1$, $90_2$, $90_3$, $90_n$ can be carried out by microprocessor 92 using bus 97. Other connection arrangements may be established between microprocessor 92 and line cards $90_1$, $90_2$, $90_3$, $90_n$, as will be recognized by those skilled in the art of communication system design.

A power supply 100 is coupled with line drivers $84_1$, $84_2$, $84_3$, $84_n$ for providing a supply voltage to respective line drivers $84_1$, $84_2$, $84_3$, $84_n$ (e.g., supply voltage $V_S$; FIG. 1). Connection among power supply 100 and line drivers $84_1$, $84_2$, $84_3$, $84_n$ is illustrated in the alternate embodiment of the invention in FIG. 4 as being effected via a line 98 coupled via a multiplexer 99 with dedicated connection lines 92. Such a connecting structure facilitates power supply 100 pollingly connecting with line drivers $84_1$, $84_2$, $84_3$, $84_n$ for providing supply voltages. Other connection arrangements may be established between power supply 100 and line drivers $84_1$, $84_2$, $84_3$, $84_n$, as will be recognized by those skilled in the art of communication system design. For example, a communication bus arrangement similar to the arrangement between microprocessor 92 and line cards $90_1$, $90_2$, $90_3$, $90_n$, with unique addresses identifying respective line drivers $84_1$, $84_2$, $84_3$, $84_n$ may be employed.

Another connection is made with microprocessor 92 to deliver an indication to microprocessor 92 of the output voltage requirement for each respective communication loop $86_1$, $86_2$, $86_3$, $86_n$. The coupling of microprocessor 92 with respective directional summer devices $88_1$, $88_2$, $88_3$, $88_n$ is illustrated in FIG. 4 as an alternate construction for effecting the connection. Other connections could likewise provide the desired information, such as connection with respective communication loops $86_1$, $86_2$, $86_3$, $86_n$, or other loci downstream from line drivers $84_1$, $84_2$, $84_3$, $84_n$. Connection among microprocessor 92 and directional summer devices $88_1$, $88_2$, $88_3$, $88_n$ is illustrated in the alternate embodiment of the invention in FIG. 4 as being effected via dedicated connection lines 104, a multiplexer 106 and a connecting line 108. Such an arrangement allows microprocessor 92 to poll directional summer devices $88_1$, $88_2$, $88_3$, $88_n$ in turn to determine desired information for each respective directional summer device $88_1$, $88_2$, $88_3$, $88_n$. Other connection arrangements may be established between microprocessor 92 and directional summer devices $88_1$, $88_2$, $88_3$, $88_n$, as will be recognized by those skilled in the art of communication system design. For example, a communication bus arrangement similar to the arrangement between microprocessor 92 and line cards $90_1$, $90_2$, $90_3$, $90_n$, with unique addresses identifying respective directional summer devices $88_1$, $88_2$, $88_3$, $88_n$ may be employed.

Microprocessor 92 is coupled with power supply 100, as indicated by a connecting line 93, to facilitate the desired cooperation between microprocessor 92 and power supply 100 for tailoring supply voltages provided to respective line drivers $84_1, 84_2, 84_3, 84_n$ taking into account the operating conditions then extant with each respective line driver $84_1, 84_2, 84_3, 84_n$. Such operating conditions may include, for example, a no-load condition, in which situation adjustment may be made to deliver a predetermined minimum power from a particular power supply to deliver a predetermined quiescent current to a particular line driver $84_1, 84_2, 84_3, 84_n$ operating in a no-load condition. This is possible because microprocessor 92 receives information relating to the extant operating conditions of line drivers $84_1, 84_2, 84_3, 84_n$ and shares that information with power supply 100. Thus, power supply 100 can ensure that no excess power is delivered to line drivers $84_1, 84_2, 84_3, 84_n$. No excess power means that no unnecessary heat is generated. In practice a certain minimal amount of extra power may be delivered to line drivers $84_1, 84_2, 84_3, 84_n$ in order to ensure safe operating margins are established to avoid interruption of service.

Determination of operating conditions for respective line drivers $84_1, 84_2, 84_3, 84_n$ may be carried out during training cycles conducted by line drivers. Such training cycles are typically conducted at start up, and may be periodically repeated at intervals or upon occurrence of predetermined events during operation of a communication system. Alternatively, determination of operating conditions for line drivers $84_1, 84_2, 84_3, 84_n$ may be carried out on a continuing basis during operation of a communication system. Such a continuing determining of operating conditions provides a capability for adjusting power output from a power supply to respective line drivers "on the fly".

Figure 5:
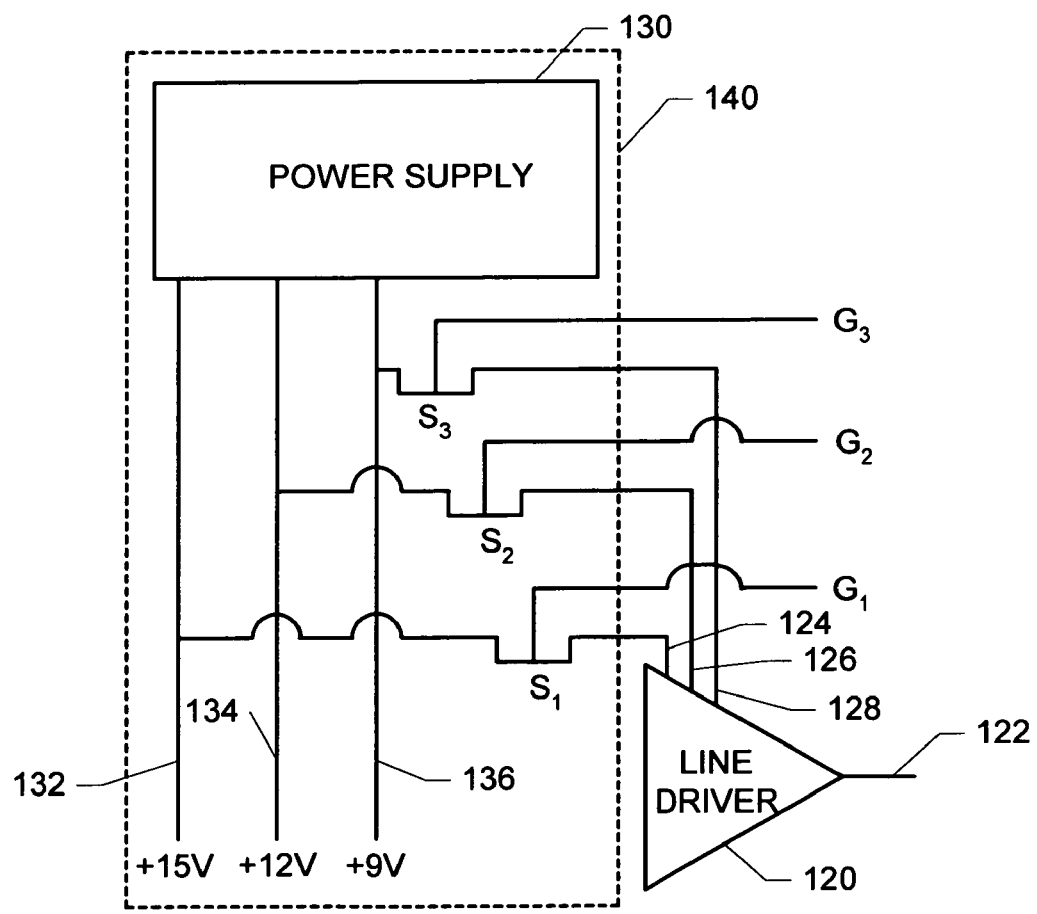
FIG. 5 is a schematic diagram illustrating a second alternate embodiment of the present invention.

FIG. 5 is a schematic diagram illustrating a second alternate embodiment of the present invention. In FIG. 5, a line driver 120 with an output terminal 122 has a plurality of supply terminals 124, 126, 128. Each supply terminal 124, 126, 128 is connected with a respective switch $S_1, S_2, S_3$. Switches $S_1, S_2, S_3$ are each gatingly controlled by a respective gating line $G_1, G_2, G_3$.

A power supply 130 is configured to provide selected voltages at respective independent output terminals 132, 134, 136. Thus, by way of example and not by way of limitation, output terminal 132 may present 15 volts, output terminal 134 may present 12 volts and output terminal 136 may present 9 volts. Each respective switch $S_1, S_2, S_3$ is coupled with a respective output terminal 132, 134, 136. By this configuration, one of a particular predetermined supply voltage levels (e.g., 15 volts, 12 volts or 9 volts) may be selected for use by line driver 120 by closing a particular switch $S_1, S_2, S_3$. Selection of which switch $S_1, S_2, S_3$ to close is carried out by applying a gating signal to a particular gating line $G_1, G_2, G_3$.

Power supply 130 may be embodied in a power supply apparatus 140 (indicated by a dotted line in FIG. 5). In such an embodiment, the various power output levels are available inside power supply apparatus 140, and connection between power supply apparatus 140 and line driver 120 may be established using any of the several structures previously described in connection with FIGS. 3 and 4, including independent connection lines, bus and multiplexer arrangements.

It is to be understood that, while the detailed drawings and specific examples given describe preferred embodiments of the invention, they are for the purpose of illustration only, that the apparatus and method of the invention are not limited to the precise details and conditions disclosed and that various changes may be made therein without departing from the spirit of the invention which is defined by the following claims.

I claim:

1. An apparatus for providing power to a plurality of line driver devices in a communication system; each respective line driver device having a respective output for driving a communication loop of said communication system; the apparatus comprising:
   (a) a power supply device coupled with each of said line driver devices for providing power supply tailored to each said line driver devices; and
   (b) a controller coupled with said power supply and having an input for receiving a signal indicative of an operating condition for said communication loops, said controller further adapted to determine a minimum drive power for a respective communication loop responsive to receiving an operating condition signal thereof and cooperative with said power supply device for providing power to an associated line driver device for effectuating said minimum drive power, wherein said communication loop operating condition is determined during a startup training cycle.

2. An apparatus as recited in claim 1 wherein said control device is a respective control device coupled with each said line driver devices.

3. An apparatus as recited in claim 1 wherein said controller is further adapted to poll each communication loop for determining said operating condition.

4. An apparatus as recited in claim 1 wherein said control device is a single control device coupled with each said line driver devices.

5. An apparatus as recited in claim 1 wherein said operating condition includes data rate, loop length, and load requirements.

6. An apparatus as recited in claim 1 wherein said power supply device is a respective power supply device coupled with each said respective line driver device.

7. An apparatus as recited in claim 1 wherein said power supply device is a single power supply device coupled with each said respective line driver device.

8. An apparatus for providing power to selected line driver devices of a plurality of line driver devices in a communication system; each selected line driver device being coupled with a respective communication loop and providing a respective minimum operational voltage to said respective communication loop; the apparatus comprising:
   (a) a control means for controlling supply voltage to said selected line driver devices; said control means being coupled with said selected line driver devices, said control means further for receiving an operating condition for said respective communication loops and responsive thereto for determining a corresponding line driver device voltage for effectuating said respective minimum operational voltage, wherein said communication loop operating condition is determined during a startup training cycle; and
   (b) a power supply means; said power supply means being coupled with said control means and with said selected line driver devices; said power supply means cooperating with said control means to deliver said corresponding line driver device voltage to respective said selected line driver devices.

9. An apparatus for providing power to selected line driver devices of a plurality of line driver devices in a communication system as recited in claim 8 wherein said control means is a respective control device coupled with each said respective selected line driver device.

10. An apparatus for providing power to selected line driver devices of a plurality of line driver devices in a communication system as recited in claim 9 wherein said power supply means is a respective power supply device coupled with each said respective selected line driver device.

11. Au apparatus for providing power to selected line driver devices of a plurality of line driver devices in a communication system as recited in claim 8 wherein said control means is further adapted to poll each communication loop for determining said operating condition.

12. An apparatus for providing power to selected line driver devices of a plurality of line driver devices in a communication system as recited in claim 8 wherein said control means is a single control device coupled with each said respective selected line driver device.

13. An apparatus for providing power to selected line driver devices of a plurality of line driver devices in a communication system as recited in claim 8 wherein said operating condition includes data rate, loop length, and load.

14. An apparatus for providing power to selected line driver devices of a plurality of line driver devices in a communication system as recited in claim 8 wherein said power supply means is a respective power supply device coupled with each said respective selected line driver device.

15. An apparatus for providing power to selected line driver devices of a plurality of line driver devices in a communication system as recited in claim 8 wherein said power supply means is a single power supply device coupled with each said respective selected line driver device.

16. An apparatus for providing power to selected line driver devices of a plurality of line driver devices in a communication system as recited in claim 8 wherein said control means is coupled with said selected line driver devices via individual control lines intermediate each respective said selected line driver device and said control means.

17. An apparatus for providing power to selected line driver devices of a plurality of line driver devices in a communication system as recited in claim 8 wherein said control means is coupled with said selected line driver devices via a communication bus intermediate said selected line driver devices and said control means; each respective said selected line driver device being assigned a respective address; said control means identifying information received via said communication bus according to an accompanying respective said selected line driver address.

18. An apparatus for providing power to selected line driver devices of a plurality of line driver devices in a communication system as recited in claim 8 wherein said control means is coupled with said selected line driver devices via individual communication lines intermediate each respective said selected line driver device and said control means.

19. An apparatus for providing power to selected line driver devices of a plurality of line driver devices in a communication system as recited in claim 8 wherein said control means is coupled with said selected line driver devices via a multiplexer for pollingly determining extant operational voltage for said respective communication loops.

20. An apparatus for providing power to selected line driver devices of a plurality of line driver devices in a communication system as recited in claim 8 wherein said power supply means is coupled with said selected line driver devices via a control bus intermediate said selected line driver devices and said power supply means; each respective said selected line driver device being assigned a respective address; said power supply means identifying a destination for information dispatched via said control bus according to an accompanying respective said selected line driver address.

21. An apparatus for providing power to selected line driver devices of a plurality of line driver devices in a communication system as recited in claim 8 wherein said power supply means is coupled with said selected line driver devices via individual communication lines intermediate each respective said selected line driver device and said power supply means.

22. An apparatus for providing power to selected line driver devices of a plurality of line driver devices in a communication system as recited in claim 8 wherein said power supply means is coupled with said selected line driver devices via a multiplexer for pollingly identifying a destination for information dispatched from said power supply means.

23. An apparatus for providing power to selected line driver devices of a plurality of line driver devices in a communication system as recited in claim 8 wherein said power supply means further includes a plurality of power supply lines; each said power supply line of said plurality of power supply lines carrying a predetermined power supply potential; said power supply means and said control means cooperating to selectively couple each respective selected line driver device to an appropriate power supply line of said plurality of power supply lines; said appropriate power supply line carrying said power supply potential sufficient to at least match said respective supply voltage.

* * * * *